United States Patent
Sanz et al.

(10) Patent No.: US 11,845,830 B2
(45) Date of Patent: Dec. 19, 2023

(54) METHOD FOR PRODUCING A COMPOSITION COMPRISING A POLYURETHANE WITH NCO END GROUPS

(71) Applicants: BOSTIK SA, Colombes (FR); UNIVERSITE CLAUDE BERNARD LYON 1, Villeurbanne (FR); CENTRE NATIONAL DE LA RECHERCHE SCIENTIFIQUE, Paris (FR); CPE LYON FORMATION CONTINUE ET RECHERCHE-CPE LYON FCR, Villeurbanne (FR)

(72) Inventors: Federico Sanz, Venette (FR); Guillaume Michaud, Venette (FR); Frédéric Simon, Venette (FR); Jean Raynaud, Villeurbanne (FR); Vincent Monteil, Lyons (FR); Lionel Bosco, Chateauneuf-le-Rouge (FR)

(73) Assignees: BOSTIK SA, Colombes (FR); UNIVERSITE CLAUDE BERNARD LYON 1, Villeurbanne (FR); CENTRE NATIONAL DE LA RECHERCHE SCIENTIFIQUE, Paris (FR); CPE LYON FORMATION CONTINUE ET RECHERCHE—CPE LYON FCR, Villeurbanne (FR)

( * ) Notice: Subject to any disclaimer, the term of this patent is extended or adjusted under 35 U.S.C. 154(b) by 311 days.

(21) Appl. No.: 16/768,105

(22) PCT Filed: Dec. 19, 2018

(86) PCT No.: PCT/FR2018/053398
§ 371 (c)(1),
(2) Date: May 29, 2020

(87) PCT Pub. No.: WO2019/122706
PCT Pub. Date: Jun. 27, 2019

(65) Prior Publication Data
US 2020/0308337 A1    Oct. 1, 2020

(30) Foreign Application Priority Data
Dec. 20, 2017   (FR) ..................... 1762601

(51) Int. Cl.
| | | |
|---|---|---|
| *C08G 18/12* | (2006.01) | |
| *C08G 18/76* | (2006.01) | |
| *C08G 18/08* | (2006.01) | |
| *C08G 18/16* | (2006.01) | |
| *C08G 18/20* | (2006.01) | |
| *C08G 18/22* | (2006.01) | |
| *C08G 18/48* | (2006.01) | |
| *C08L 75/08* | (2006.01) | |
| *C09J 175/08* | (2006.01) | |

(52) U.S. Cl.
CPC ..... *C08G 18/7671* (2013.01); *C08G 18/0895* (2013.01); *C08G 18/12* (2013.01); *C08G 18/163* (2013.01); *C08G 18/2081* (2013.01); *C08G 18/227* (2013.01); *C08G 18/4812* (2013.01); *C08L 75/08* (2013.01); *C09J 175/08* (2013.01)

(58) Field of Classification Search
CPC .................................................. C08G 18/163
See application file for complete search history.

(56) References Cited

U.S. PATENT DOCUMENTS

| | | | |
|---|---|---|---|
| 6,359,023 B1 * | 3/2002 | Kluth | C08G 63/83 521/157 |
| 6,362,300 B1 | 3/2002 | Araki et al. | |
| 2007/0260031 A1 | 11/2007 | Wintermantel et al. | |
| 2012/0130002 A1 * | 5/2012 | Schall | C08G 18/2063 524/507 |
| 2012/0248371 A1 * | 10/2012 | Ross | C08G 18/546 252/182.15 |
| 2015/0175850 A1 | 6/2015 | Michaud et al. | |
| 2019/0002621 A1 | 1/2019 | Sanz et al. | |

FOREIGN PATENT DOCUMENTS

| | | | |
|---|---|---|---|
| EP | 2886571 A1 | 6/2015 | |
| FR | 3045616 A1 | 6/2017 | |
| JP | 2005272525 A | * | 10/2005 |
| WO | 2012010559 A1 | 1/2012 | |

OTHER PUBLICATIONS

Google Translation of JP 2005272525 A (Year: 2022).*
Espacenet Translation of JP 2005272525 A (Year: 2023).*

* cited by examiner

*Primary Examiner* — Michael M Dollinger
(74) *Attorney, Agent, or Firm* — NK Patent Law

(57) ABSTRACT

The present invention relates to a method for producing a composition comprising at least one polyurethane with NCO end groups, and at least one catalyst B selected from among tertiary amines, said method comprising the following steps: a) production of a polyurethane with NCO end groups, comprising a step of polyaddition of a polyol composition and a polyisocyanate composition, in the presence of at least one catalyst A selected from the group consisting of— organo-metallic catalysts excluding tin-based catalysts, —tertiary amines, and—mixtures of same; and b) the addition of at least one catalyst B, selected from among tertiary amines, to the polyurethane with NCO end groups obtained in step a).

20 Claims, No Drawings

METHOD FOR PRODUCING A COMPOSITION COMPRISING A POLYURETHANE WITH NCO END GROUPS

CROSS-REFERENCE TO RELATED APPLICATIONS

This application is a U.S. National Stage application of International Patent Application No. PCT/FR2018/053398, filed on Dec. 19, 2018, which claims the benefit of French Patent Application No. 1762601, filed on Dec. 20, 2017.

FIELD OF THE INVENTION

The present invention relates to a process for the preparation of a composition comprising a polyurethane having NCO end groups and at least one catalyst.

The present invention also relates to a composition comprising a polyurethane having NCO end groups and at least one catalyst, and also to its use as adhesive, sealant or surface coating.

TECHNICAL BACKGROUND

Sealants are widely used in the construction field, in particular for assembling substrates, for example made of concrete or of steel, via expansion joints and for making it possible, by virtue of their mechanical and in particular elastic properties, to obtain a joint which is stable to the dimensional variations brought about in particular by changes in temperature.

Sealants include those obtained from moisture-crosslinkable polyurethane compositions. The latter are commonly prepared by a process employing a polyaddition stage in the presence of tin-based catalyst, such as dioctyltin dilaurate (DOTL) or dibutyltin dilaurate (DBTL). However, these catalysts exhibit high toxicological risks for man and the environment.

Other processes for the preparation of compositions based on polyurethanes employ bismuth-based catalysts. These catalysts are typically used at high concentrations, due to their lower catalytic activity than tin-based catalysts, during the stage of crosslinking the composition. However, such compositions have a limited lifetime on storage and experience an increase in their viscosity over time, which is generally accompanied by an increasing deterioration in the properties of said composition.

There exists a need for a novel process for the preparation of polyurethane-based composition which is friendlier to man and to the environment.

There also exists a need for a novel process for the preparation of polyurethane-based composition which results in compositions which are both stable on storage and exhibit good adhesion and/or mechanical properties.

There also exists a need for novel compositions not exhibiting at least one of the abovementioned disadvantages.

DESCRIPTION OF THE INVENTION

The present invention relates to a process for the preparation of a composition comprising at least one polyurethane having NCO end groups and at least one catalyst B chosen from tertiary amines, said process comprising the following stages:

a) preparation of a polyurethane having NCO end groups, comprising a stage of polyaddition of a composition of polyol(s) and of a composition of polyisocyanate(s), in the presence of at least one catalyst A chosen from the group consisting:
of organometallic catalysts, with the exception of tin-based catalysts,
of tertiary amines, and
of their mixtures,
b) addition of at least one catalyst B chosen from tertiary amines to the polyurethane having NCO end groups obtained on conclusion of stage a).

According to a preferred embodiment, the present invention relates to a process for the preparation of a composition comprising at least one polyurethane having NCO end groups and at least one catalyst B chosen from tertiary amines, said process comprising the following stages:

a) preparation of a polyurethane having NCO end groups, comprising a stage of polyaddition of a composition of polyol(s) and of a composition of polyisocyanate(s), in the presence of at least one catalyst A chosen from the group consisting:
of organometallic catalysts, with the exception of tin-based catalysts,
of tertiary amines, and
of their mixtures,
b) addition of at least one catalyst B chosen from tertiary amines to the polyurethane having NCO end groups obtained on conclusion of stage a),
said process being characterized in that the total content of catalyst(s) A is less than or equal to 10 000 ppm, preferably less than or equal to 1000 ppm, with respect to the total weight of the reactants used in the polyaddition reaction, and, when the catalyst A is chosen from tertiary amines, its total content is less than 400 ppm, with respect to the total weight of the reactants used in the polyaddition reaction.

A. Process

A.1. Stage a)

Polyurethane Having NCO End Groups

The polyurethane having NCO end groups can have a viscosity at 23° C. of less than or equal to 300,000 mPa·s, preferably of less than or equal to 250,000 mPa·s, more preferentially ranging from 100 mPa·s to 200,000 mPa·s, in particular from 4,000 mPa·s to 150,000 mPa·s and advantageously from 10,000 to 150,000 mPa·s.

The viscosity can be measured using a Brookfield viscometer according to the standard ISO 2555 (1999). Typically, the measurement carried out at 23° C. can be performed using a Brookfield RVT viscometer with a spindle suited to the viscosity range and at a rotational speed of 20 revolutions per minute.

The polyurethane having NCO end groups can have a number-average molecular weight ranging from 1,000 g/mol to 50,000 g/mol, preferably from 1,000 g/mol to 30,000 g/mol, preferentially from 5,000 g/mol to 20,000 g/mol, advantageously from 10,000 g/mol to 20,000 g/mol.

The number-average molecular weight of the polyurethanes having NCO end groups can be measured by methods well known to a person skilled in the art, for example by size exclusion chromatography (or SEC) using standards of polyethylene glycol type.

The polyurethane having NCO end groups can have a polydispersity index ranging from 1.5 to 3.5, preferably from 2.0 to 3.3.

In the context of the invention, the polydispersity index is defined as the $M_w$ (weight-average molecular weight)/$M_n$ (number-average molecular weight) ratio of the polyurethane.

Polyol(s)

The abovementioned composition of polyol(s) can consist of a polyol or of a mixture of polyols.

The polyol(s) which can be used can be chosen from that (those) having a number-average molecular weight ranging from 200 g/mol a 20,000 g/mol, preferably from 400 g/mol to 18,000 g/mol.

The weight-average molecular weight of the polyols can be calculated from the hydroxyl number (OHN), expressed in mg KOH/g, and from the functionality of the polyol or determined by methods well known to a person skilled in the art, for example by size exclusion chromatography (or SEC) with PEG (polyethylene glycol) standard.

Preferably, the polyols have a hydroxyl functionality ranging from 2 to 6. In the context of the invention, and unless otherwise mentioned, the hydroxyl functionality of a polyol is the mean number of hydroxyl functional groups per mole of polyol.

The polyol(s) which can be used can be chosen from polyester polyols, polyether polyols, polydiene polyols, polycarbonate polyols, poly(ether-carbonate) polyols, prepolymers having —OH end groups and their mixtures.

The polyol(s) which can be used can be chosen from aromatic polyols, aliphatic polyols, carbonate polyols and the mixtures of these compounds.

According to the invention, the polyester polyol(s) can have a number-average molecular weight ranging from 1000 g/mol to 10,000 g/mol, preferably from 2,000 g/mol to 6,000 g/mol.

Mention may be made, among the polyester polyols, for example, of:

polyester polyols of natural origin, such as castor oil;
polyester polyols resulting from the condensation:
of one or more aliphatic (linear, branched or cyclic) or aromatic polyols, such as, for example, ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine and their mixtures, with
one or more polycarboxylic acids or an ester or anhydride derivative thereof, such as 1,6-hexanedioic acid, dodecanedioic acid, azelaic acid, sebacic acid, adipic acid, 1,18-octadecanedioic acid, phthalic acid, succinic acid and the mixtures of these acids, an unsaturated anhydride, such as, for example, maleic or phthalic anhydride, or a lactone, such as, for example, caprolactone.

The abovementioned polyester polyols can be prepared conventionally and are for the most part commercially available.

Mention may be made, among the polyester polyols, for example, of the following products with hydroxyl functionality equal to 2:

Tone® 0240 (sold by Union Carbide), which is a polycaprolactone with a number-average molecular weight of approximately 2,000 g/mol and a melting point of approximately 50° C., Dynacoll® 7381 (sold by Evonik) with a number-average molecular weight of approximately 3500 g/mol and having a melting point of approximately 65° C., Dynacoll® 7360 (sold by Evonik), which results from the condensation of adipic acid with hexanediol and has a number-average molecular weight of approximately 3,500 g/mol and a melting point of approximately 55° C., Dynacoll® 7330 (sold by Evonik) with a number-average molecular weight of approximately 3,500 g/mol and having a melting point of approximately 85° C., Dynacoll® 7363 (sold by Evonik), which also results from the condensation of adipic acid with hexanediol and has a number-average molecular weight of approximately 5,500 g/mol and a melting point of approximately 57° C., Dynacoll® 7250 (sold by Evonik): polyester polyol having a viscosity of 180 Pa·s at 23° C., a number-average molecular weight Mn equal to 5,500 g/mol and a $T_g$ equal to −50° C., Kuraray® P-6010 (sold by Kuraray): polyester polyol having a viscosity of 68 Pa·s at 23° C., a number-average molecular weight equal to 6,000 g/mol and a $T_g$ equal to −64° C., Kuraray® P-10010 (sold by Kuraray): polyester polyol having a viscosity of 687 Pa·s at 23° C. and a number-average molecular weight equal to 10,000 g/mol.

According to a preferred embodiment, the polyester polyol is chosen from: a polycaprolactone; castor oil; a polyester polyol resulting from the condensation of ethylene glycol, propylene glycol, 1,3-propanediol and/or 1,6-hexanediol with adipic acid and/or the various isomers of phthalic acid; and their mixtures.

According to the invention, the polyether polyol(s) can have a number-average molecular weight ranging from 200 g/mol to 20,000 g/mol, preferably from 400 g/mol to 12,000 g/mol.

Preferably, the polyether polyol(s) has (have) a hydroxyl functionality ranging from 2 á 3.

The polyether polyol(s) which can be used according to the invention is (are) preferably chosen from polyoxyalkylene polyols, the linear or branched alkylene part of which comprises from 1 to 4 carbon atoms, preferably from 2 to 3 carbon atoms.

More preferentially, the polyether polyol(s) which can be used according to the invention is (are) preferably chosen from polyoxyalkylene diols or polyoxyalkylene triols and better still polyoxyalkylene diols, the linear or branched alkylene part of which comprises from 1 to 4 carbon atoms, preferably from 2 to 3 carbon atoms.

Mention may be made, as examples of polyoxyalkylene diols or triols which can be used according to the invention, for example, of:

polyoxypropylene diol or triol (also denoted by polypropylene glycol (PPG) diol or triol) having a number-average molecular weight ranging from 400 g/mol to 18,000 g/mol and preferably ranging from 400 g/mol to 4,000 g/mol, polyoxyethylene diol or triol (also denoted by polyethylene glycol (PEG) diol or triol) having a number-average molecular weight ranging from 400 g/mol to 18,000 g/mol and preferably ranging from 400 g/mol to 4,000 g/mol, polyoxybutylene glycol (also denoted by polybutylene glycol (PBG) diol or triol) having a number-average molecular weight ranging from 200 g/mol to 4,000 g/mol, PPG/PEG/PBG copolymer or terpolymer diol or triol having a number-average molecular weight ranging from 400 g/mol to 18,000 g/mol and preferably ranging from 400 g/mol to 4,000 g/mol, polytetrahydrofuran (PolyTHF) diol or triol having a number-average molecular weight ranging from 250 g/mol to 4,000 g/mol, polytetramethylene glycols (PTMG) having a number-average molecular weight ranging from 200 g/mol to 4,000 g/mol, and their mixtures.

Preferably, the polyether polyol(s) which can be used is (are) chosen from polyoxypropylene diols or triols. The polyether polyols mentioned above can be prepared conventionally and are widely available commercially. They can, for example, be obtained by polymerization of the corresponding alkylene oxide in the presence of a catalyst based on a double metal/cyanide complex.

Mention may be made, as examples of polyether diols, of the polyoxypropylene diols sold under the name Acclaim® by Bayer, such as Acclaim® 12200, with a number-average molecular weight in the vicinity of 11 335 g/mol, Acclaim® 8200, with a number-average molecular weight in the vicinity of 8057 g/mol, and Acclaim® 4200, with a number-average molecular weight in the vicinity of 4,020 g/mol, or else of the polyoxypropylene diol sold under the name Voranol P2000 by Dow, with a number-average molecular weight in the vicinity of 2,004 g/mol.

Mention may be made, as example of polyether triols, of the polyoxypropylene triol sold under the name Voranol CP3355 by Dow, with a number-average molecular weight in the vicinity of 3,554 g/mol.

The polydiene polyol(s) which can be used according to the invention can preferably be chosen from polydienes comprising hydroxyl end groups, and their corresponding hydrogenated or epoxidized derivatives.

Preferably, the polydiene polyol(s) which can be used according to the invention is (are) chosen from polybutadienes comprising hydroxyl end groups, which are optionally hydrogenated or epoxidized. Preferentially, the polydiene polyol(s) which can be used according to the invention is (are) chosen from butadiene homopolymers and copolymers comprising hydroxyl end groups, which are optionally hydrogenated or epoxidized.

In the context of the invention, and unless otherwise indicated, the term "hydroxyl end groups" of a polydiene polyol is understood to mean the hydroxyl groups located at the ends of the main chain of the polydiene polyol.

The hydrogenated derivatives mentioned above can be obtained by complete or partial hydrogenation of the double bonds of a polydiene comprising hydroxyl end groups, and are thus saturated or unsaturated.

The epoxidized derivatives mentioned above can be obtained by chemoselective epoxidation of the double bonds of the main chain of a polydiene comprising hydroxyl end groups, and thus comprise at least one epoxy group in its main chain.

Mention may be made, as examples of polybutadiene polyols, of saturated or unsaturated butadiene homopolymers comprising hydroxyl end groups which are optionally epoxidized, such as, for example, those sold under the name Poly BD® or Krasol® by Cray Valley.

According to the invention, the prepolymers having —OH end groups can be obtained by polyaddition reaction between one or more polyol(s) and one or more polyisocyanate(s), in amounts of polyisocyanate(s) and of polyol(s) resulting in an NCO/OH molar ratio strictly of less than 1. The reaction can be carried out in the presence of a catalyst, the catalyst preferably being a catalyst A according to the invention, namely chosen from the group consisting of organometallic catalysts, with the exception of tin-based catalysts, tertiary amines and their mixtures. The polyols and polyisocyanates which can be used can be those typically used in the preparation of prepolymer having —OH end groups and preferably those described in the preparation of the polyurethane having NCO end groups according to the invention.

Mention may be made, as examples of polycarbonate diol, of Converge Polyol 212-10 and Converge Polyol 212-20 sold by Novomer, respectively with number-average molecular weights (Mn) equal to 1,000 and 2,000 g/mol, the hydroxyl numbers of which are respectively 112 and 56 mg KOH/g, Desmophen® C XP 2716 sold by Covestro, with a number-average molecular weight (Mn) equal to 326 g/mol, the hydroxyl number of which is 344 mg KOH/g, and Polyol C-590, C-1090, C-2090 and C-3090 sold by Kuraray, having a number-average molecular weight (Mn) ranging from 500 to 3,000 g/mol and a hydroxyl number ranging from 224 to 37 mg KOH/g.

Preferably, the composition of polyol(s) consists of one or more polyols chosen from those mentioned above and their mixtures. In particular, the composition of polyol(s) can consist of one or more polyols, including at least one polyether polyol. More particularly, the composition of polyol(s) can consist of one or more polyether polyols.

Polyisocyanate1(s)

In the context of the invention, the term "polyisocyanate" is understood to mean a compound comprising at least two isocyanate groups (NCO).

The abovementioned composition of polyisocyanate(s) can consist of a polyisocyanate or of a mixture of polyisocyanates.

The polyisocyanate(s) which can be used can be chosen from those typically used in the synthesis of a polyurethane having NCO end groups.

The polyisocyanate(s) which can be used can be aliphatic (linear or branched) or aromatic, and optionally substituted.

Preferably, the polyisocyanate(s) is (are) chosen from diisocyanates, triisocyanates and their mixtures.

According to a preferred embodiment, the polyisocyanate(s) is (are) chosen from the group consisting of pentamethylene diisocyanate (PDI), hexamethylene diisocyanate (HDI), heptane diisocyanate, octane diisocyanate, nonane diisocyanate, decane diisocyanate, undecane diisocyanate, dodecane diisocyanate, methylenebis(4-cyclohexyl isocyanate) (HMDI), isophorone diisocyanate (IPDI), norbornane diisocyanate, norbornene diisocyanate, 1,4-cyclohexane diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2,4,4-trimethylhexane, 1,6-diisocyanato-2,2,4-trimethylhexane (TMDI), 4-isocyanatomethyl-1,8-octane diisocyanate (TIN), 2,5-bis (isocyanatomethyl)bicyclo[2.2.1]heptane (2,5-NBDI), 2,6-bis(isocyanatomethyl)bicyclo[2.2.1]heptane (2,6-NBDI), 1,3-bis(isocyanatomethyl)cyclohexane (1,3-H6-XDI), 1,4-bis(isocyanatomethyl)cyclohexane (1,4-H6-XDI), toluene diisocyanate (TDI), diphenylmethylene diisocyanate (MDI), dicyclohexylmethylene diisocyanate (H12-MDI), xylylene diisocyanate (XDI) (especially meta-xylylene diisocyanate (m-XDI)) and their mixtures.

The MDI can be in the form of an isomer or of a mixture of isomers, such as 4,4'-MDI and/or 2,4'-MDI.

The TDI can be in the form of an isomer or of a mixture of isomers, such as 2,4-TDI and/or 2,6-TDI.

Preferably, the polyisocyanate is MDI and in particular 4,4'-MDI.

The polyisocyanate(s) which can be used to prepare the polyurethane used according to the invention are typically widely available commercially. Mention may be made, by way of examples, of Scuranate® TX sold by Vencorex, corresponding to a 2,4-TDI with a purity of the order of 95%, Scuranate® T100 sold by Vencorex, corresponding to a 2,4-TDI with a purity of greater than 99% by weight, Desmodur® I sold by Covestro, corresponding to an IPDI, or else Isonate® M125 sold by Dow, corresponding to an MDI containing at least 97% by weight of the 4,4'-MDI isomer.

Process for the Preparation of the Polyurethane Having NCO End Groups (Stage a)

In the context of the invention, the expressions "polyaddition reaction" and "polyaddition" are equivalently understood.

The polyaddition stage can be carried out at a temperature of less than 95° C., preferably ranging from 65° C. to 90° C., more preferentially ranging from 75° C. to 85° C.

The polyaddition stage can be carried out under anhydrous conditions, for example under a nitrogen atmosphere.

The polyaddition stage can be carried out in amounts of polyisocyanate(s) and of polyol(s) such that the NCO/OH molar ratio is strictly greater than 1, for example of between 1.1 and 2.5, preferably between 1.5 and 2.2, preferentially between 1.60 and 2.0, for example between 1.60 and 1.90, advantageously between 1.60 and 1.85, in particular between 1.7 and 1.85, so as to advantageously obtain a polyurethane having NCO end groups.

The polyaddition stage can also be carried out in amounts of polyisocyanate(s) and polyol(s) such that the NCO/OH molar ratio is strictly less than 1, in order to advantageously result in a polyurethane having OH end groups.

In the context of the invention, and unless otherwise mentioned, the NCO/OH molar ratio corresponds to the molar ratio of the number of isocyanate (NCO) groups to the number of hydroxyl (OH) groups respectively carried by the polyisocyanates and the polyols used.

According to one embodiment, the process for the preparation of the polyurethane having NCO end groups comprises a stage ii) subsequent to the abovementioned polyaddition stage. In particular, the process for the preparation of said polyurethane having NCO end groups comprises:

i) a first stage of polyaddition of a composition of polyol(s) and of a composition of polyisocyanate(s), in the presence of at least one catalyst A chosen from the group consisting:
of organometallic catalysts, with the exception of tin-based catalysts,
of tertiary amines, and
of their mixtures,
said polyaddition stage being carried out in amounts of polyisocyanate(s) and of polyol(s) resulting in an NCO/OH molar ratio strictly of less than 1, preferably of less than or equal to 0.9, preferentially of less than or equal to 0.8, advantageously of less than or equal to 0.7, in particular of less than or equal to 0.6, in order to result in a polyurethane having OH end groups, and ii) a second stage of polyaddition of the polyurethane obtained in stage i) with a composition of polyisocyanate(s), in amounts of polyisocyanate(s) and of polyurethane having OH end groups resulting in an NCO/OH molar ratio of greater than 1, preferably of greater than or equal to 1.2, advantageously of greater than or equal to 1.5, in particular of greater than or equal to 1.7.

Preferably, the abovementioned stages i) and ii) are carried out under anhydrous conditions.

During the abovementioned stage ii), the NCO/OH molar ratio is strictly greater than 1 in order to obtain a polyurethane having NCO end groups. In particular, the polyurethane having NCO end groups obtained on conclusion of stage ii) no longer comprises OH end functional groups.

The abovementioned stage ii) can be carried out in the presence of a catalyst, the catalyst preferably being the catalyst A according to the invention.

Preferably, neither of stages i) and ii) is carried out in the presence of tin or of tin-based compounds, such as, for example, in the presence of tin-based catalysts.

Catalyst A

The abovementioned catalyst A is chosen from the group consisting:
of organometallic catalysts, with the exception of tin-based catalysts,
of tertiary amines, and
of their mixtures.

In the context of the invention, the term "organometallic catalysts, with the exception of tin-based catalysts" is understood to mean organometallic catalysts not comprising tin.

It may concern a mixture of catalysts of one and the same family (for example a mixture of several tertiary amines or a mixture of several organometallic compounds comprising different metal atoms) or a mixture of catalysts of different families (for example a mixture of a tertiary amine and of an organometallic compound).

In the context of the invention, the term "organometallic catalysts" is understood to mean catalysts comprising an organic radical and at least one metal.

In the context of the invention, the term "organic radical" is understood to mean a radical comprising at least one carbon atom.

The organometallic compounds can comprise organometallic compounds (compounds comprising at least one metal-carbon covalent bond), metal alkoxides, metal carboxylates and metal coordination complexes with one or more organic ligands.

Mention may be made, as example of organic ligand, of acetylacetonate.

The metal atom of the organometallic compounds can be any metal atom known to a person skilled in the art, with the exception of tin, and can in particular be chosen from aluminum, manganese, silver, copper, gold, platinum, palladium, ruthenium, rhodium, molybdenum, zinc, cobalt, iron, nickel, bismuth, titanium or zirconium. Preferably, the metal atom of the organometallic compounds is chosen from aluminum, zinc, iron, bismuth, titanium, gold and zirconium.

The organometallic catalysts can comprise several metal atoms, such as, for example, bismuth and zinc.

Preferably, the organometallic catalysts are catalysts based on bismuth and/or zinc.

In the context of the invention, the term "bismuth-based catalyst" is understood to mean a catalyst comprising bismuth. Such a catalyst can thus comprise other metal atoms in addition to bismuth, such as, for example, zinc.

In particular, the organometallic catalysts, and especially the bismuth-based catalysts, comprise exclusively bismuth as metal atom (bismuth catalysts).

The organometallic compounds (compounds comprising at least one metal-carbon covalent bond) can be carboxylates of organometallic compounds.

The metal alkoxides can be chosen from the group consisting of titanium tetrabutoxide, titanium tetraisopropoxide, zirconium tetrabutoxide, zirconium tetraisopropoxide, bismuth phenoxide and their mixtures.

The metal carboxylates can be those in which the carboxylic acid contains from 2 to 20 carbon atoms, preferably from 4 to 14 carbon atoms. Mention may be made, for example, as carboxylic acids, of butyric acid, isobutyric acid, caproic acid, caprylic acid, 2-ethylhexanoic acid, capric acid, lauric acid, myristic acid, palmitic acid, stearic acid, isostearic acid, abietic acid, neodecanoic acid, 2,2,3,5-tetramethylhexanoic acid, 2,4-dimethyl-2-isopropylpentanoic acid, 2,5-dimethyl-2-ethylhexanoic acid, 2,2-dimethyloctanoic acid, 2,2-diethylhexanoic acid and arachidic acid.

The metal carboxylates can be monocarboxylates, dicarboxylates, tricarboxylates or their mixtures.

The metal carboxylates can be chosen from the group consisting of zinc-based carboxylates, bismuth-based carboxylates, bismuth/zinc-based carboxylates and their mixtures, the metal carboxylates being in particular chosen from the group consisting of zinc carboxylates, bismuth carboxylates, bismuth/zinc carboxylates and their mixtures.

Mention may be made, among bismuth carboxylates, for example, of Borchi® KAT 320 (CAS number: 67874-71-9, bismuth 2-ethylhexanoate) and Borchi® KAT 315 (CAS number: 34364-26-6, bismuth neodecanoate), which are available from Borchers, KKAT XK-651, available from King Industries, KK KKAT XC-B221, available from King Industries, and Coscat 83 (bismuth neodecanoate, neodecanoic acid), available from Vertellus.

Mention may be made, among zinc carboxylates, for example, of Borchi® KAT 0761 (CAS number: 27253-29-8, zinc neodecanoate), available from Borchers, or TIB KAT 616 (zinc neodecanoate), available from TIB Chemicals.

Mention may be made, among bismuth/zinc carboxylates, for example, of TIB KAT 244 (bismuth/zinc 2-ethylhexanoate) from TIB Chemicals.

The catalyst A is preferably chosen from metal carboxylates and more particularly zinc-based carboxylates, bismuth-based carboxylates, bismuth/zinc-based carboxylates and their mixtures. In particular, the catalyst A is chosen from bismuth 2-ethylhexanoate, zinc 2-ethylhexanoate, bismuth neodecanoate, zinc neodecanoate, bismuth/zinc 2-ethylhexanoate and their mixtures.

The metal coordination complexes with one or more organic ligands can be chosen from the group consisting of zinc acetylacetonate, titanium acetylacetonate (for example commercially available under the name Tyzor® AA75 from Dorf Ketal), titanium tetraacetylacetonate, aluminum trisacetylacetonate, aluminum chelates, such as, for example, the monoacetylacetonate bis(ethyl acetoacetate) (for example commercially available under the name K-KAT® 5218 from King Industries), zirconium tetraacetylacetonate, diisopropoxybis(ethylacetonato)titanium and their mixtures.

Preferably, the tertiary amines are chosen from the group consisting of triethylamine, tributylamine, N,N-dimethylcyclohexylamine, dimethylbenzylamine, N,N'-dimethylpiperazine, N,N,N,N-tetramethylpropane-1,3-diamine, bis(2-dimethylaminoethyl) ether, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1,3-diamine, N,N,N,N-tetramethylpropane-1,3-diamine, N,N,N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl) hexahydrotriazine, tetramethylguanidine, 1,8-diazabicyclo [5.4.0]undec-7-ene (DBU), 1,4-diazabicyclo[2.2.2]octane (DABCO), 1,5-diazabicyclo[4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol and their mixtures.

In particular, the tertiary amines are chosen from 1,8-diazabicyclo[5.4.0]undec-7-ene (DBU), 1,5-diazabicyclo [4.3.0]non-5-ene (DBN), 2,2'-dimorpholinodiethyl ether (DMDEE), 1,4-diazabicyclo[2.2.2]octane (DABCO) and their mixtures; preferably, the catalyst A is 1,4-diazabicyclo [2.2.2]octane (DABCO) or 2,2'-dimorpholinodiethyl ether (DMDEE).

In particular, the catalyst A is not a tertiary amine salt.

According to a preferred embodiment, the catalyst A is chosen from organometallic catalysts, in particular from organometallic catalysts based on bismuth and/or zinc, such as, for example, zinc-based carboxylates, bismuth-based carboxylates, bismuth/zinc-based carboxylates or their mixtures and advantageously from zinc carboxylates, bismuth carboxylates, bismuth/zinc carboxylates and their mixtures.

According to one embodiment, the total content of catalyst(s) A used in the polyaddition reaction is less than or equal to 250 ppm, advantageously less than or equal to 50 ppm, preferentially less than or equal to 20 ppm, in particular less than or equal to 5 ppm, for example less than or equal to 1 ppm, with respect to the total weight of the reactants used in the polyaddition reaction.

According to a preferred embodiment, when the catalyst A is chosen from tertiary amines, its total content is less than or equal to 100 ppm, preferentially less than or equal to 50 ppm, for example less than or equal to 20 ppm, advantageously less than or equal to 10 ppm, with respect to the total weight of the reactants used in the polyaddition reaction.

In the context of the invention, the "ppm" correspond to "parts per million" and are ppm by weight.

Preferably, no stage of the process for the preparation of the polyurethane having NCO end groups uses tin or tin-based compounds and in particular tin-based catalysts.

Preferably, the process according to the invention is carried out in the absence of tin or of tin-based compounds, such as in the absence of tin-based catalyst. By this it is meant that no stage of the process for the preparation of the abovementioned composition comprises a stage employing tin or tin-based compounds, such as, for example, tin-based catalyst.

A.2. Stage b)

Stage b) can be carried out at a temperature of less than or equal to 50° C., preferably ranging from 5° C. to 45° C. and better still ranging from 20° C. to 30° C.

Stage b) is preferably carried out under anhydrous conditions.

A.3. Other Stages

The process according to the invention can comprise additional stages to stages a) and b).

For example, the process can comprise one or more stages of addition of additional compounds, such as, for example, at least one filler or at least one additive. Said additional compounds can be added before stage b) and/or simultaneously with stage b) and/or after stage b).

The process can comprise a stage c) of mixing the composition resulting from stage b) or resulting from an optional stage subsequent to stage b).

According to one embodiment, the process according to the invention is such that:

the abovementioned catalyst A is chosen from organometallic catalysts, with the exception of tin-based catalysts; preferably, the catalyst A is chosen from organometallic catalysts based on bismuth and/or zinc, such as, for example, zinc carboxylates, bismuth carboxylates, bismuth/zinc carboxylates and their mixtures, the crosslinking catalyst B is chosen from 2,2'-dimorpholinodiethyl ether (DMDEE), 1,4-diazabicyclo[2.2.2]octane (DABCO) and their mixtures.

According to one embodiment, the process according to the invention is such that:

the catalyst A is 1,4-diazabicyclo[2.2.2]octane (DABCO) and the catalyst B is chosen from 2,2'-dimorpholinodiethyl ether (DMDEE), 1,4-diazabicyclo[2.2.2]octane (DABCO) and their mixtures, the content of catalyst A preferably being less than 400 ppm, in particular less than or equal to 100 ppm, preferentially less than or equal to 50 ppm, for example less than or equal to 20 ppm, advantageously less than or equal to 10 ppm, with respect to the total weight of the reactants used in the polyaddition reaction.

B. Composition

The present invention also relates to a composition comprising:

at least one polyurethane having NCO end groups obtained by a process comprising at least one stage of polyaddition of a composition of polyol(s) and of a composition of polyisocyanate(s), in the presence of at least one catalyst A chosen from the group consisting:
of organometallic catalysts, with the exception of tin-based catalysts,
of tertiary amines, and
of their mixtures,
and
at least one catalyst B chosen from tertiary amines,
provided that, when the catalyst A is chosen from tertiary amines, its total content is less than 400 ppm, preferably less than or equal to 100 ppm, preferentially less than or equal to 50 ppm, for example less than or equal to 20 ppm, advantageously less than or equal to 10 ppm, with respect to the total weight of the reactants used in the polyaddition reaction.

The following sections, as well as the embodiments, apply equally well to the composition prepared according to the process described above in section A. as to the abovementioned composition comprising a specific content of catalyst A.

Catalyst B

The catalyst B is a crosslinking catalyst. It makes it possible in particular to catalyze the crosslinking of the polyurethane having NCO end groups in the presence of water or of moisture. The water or the moisture may be contributed by the surface of the support or the surrounding environment, in a natural way (atmospheric humidity) or controlled way (for example, in a thermostatically controlled chamber at a relative humidity between 40% and 70% (preferably at a humidity of approximately 50%) at 23° C., or in an oven ranging up to 150° C.) in contact with the composition according to the invention. This crosslinking is reflected in particular by the creation, between the polymeric chains of the polyurethane, of bonds of urea type which result in the formation of a three-dimensional polymeric network.

The catalyst B can be chosen from the group consisting of triethylamine, tributylamine, N,N-dimethylcyclohexylamine, dimethylbenzylamine, N,N'-dimethylpiperazine, N,N,N,N-tetramethylpropane-1,3-diamine, bis(2-dimethylaminoethyl) ether, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1,3-diamine, N,N,N,N-tetramethylpropane-1,3-diamine, N,N, N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl)hexahydrotriazine, tetramethylguanidine, 1,8-diazabicyclo[5.4.0]undec-7-ene (DBU), 1,4-diazabicyclo[2.2.2]octane (DABCO), 1,5-diazabicyclo[4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol and their mixtures.

According to one embodiment, the catalyst B is chosen from the group consisting of triethylamine, tributylamine, N,N-dimethylcyclohexylamine, dimethylbenzylamine, N,N'-dimethylpiperazine, N,N,N,N-tetramethylpropane-1,3-diamine, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1,3-diamine, N,N,N, N-tetramethylpropane-1,3-diamine, N,N,N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl)hexahydrotriazine, tetramethylguanidine, 1,8-diazabicyclo[5.4.0]undec-7-ene (DBU), 1,4-diazabicyclo[2.2.2]octane (DABCO), 1,5-diazabicyclo[4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol and their mixtures.

Preferably, the catalyst B is chosen from the group consisting of N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, 1,8-diazabicyclo[5.4.0]undec-7-ene (DBU), 1,4-diazabicyclo[2.2.2]octane (DABCO), 1,5-diazabicyclo[4.3.0]non-5-ene (DBN) and their mixtures.

More preferably still, the catalyst B is chosen from 1,8-diazabicyclo[5.4.0]undec-7-ene (DBU), 1,5-diazabicyclo[4.3.0]non-5-ene (DBN), 2,2'-dimorpholinodiethyl ether (DMDEE), 1,4-diazabicyclo[2.2.2]octane (DABCO) and their mixtures. These crosslinking catalysts exhibit the advantage of not being carcinogenic, mutagenic and reprotoxic (CMR).

According to a preferred embodiment, the catalyst B is chosen from 2,2'-dimorpholinodiethyl ether (DMDEE), 1,4-diazabicyclo[2.2.2]octane (DABCO) and their mixtures.

The catalyst B can be chosen from DMDEE/DABCO mixtures having a ratio by weight ranging from 100/0 to 0/100, preferably from 30/70 to 70/30 and advantageously from 40/60 to 60/40, the ratio in particular being 50/50.

The total content of catalyst B in the composition can be less than or equal to 1%, preferably less than or equal to 0.8%, preferentially less than or equal to 0.5%, advantageously less than or equal to 0.3%, for example less than or equal to 0.2%, by weight, with respect to the total weight of said composition.

The total content of catalyst B in the composition can range from 0.001% to 1%, preferably from 0.01% to 0.8%, advantageously from 0.1% to 0.5%, by weight, with respect to the total weight of said composition.

The total content of catalyst B in the composition can be chosen from one of the following contents: 0.001%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9% or 1% by weight, with respect to the total weight of said composition, the total content of catalyst B preferably being 0.2% by weight, with respect to the total weight of said composition.

Filler

The composition can comprise a filler.

The filler can be chosen from organic fillers, inorganic fillers and their mixtures.

Use may be made, as organic filler(s), of any organic filler and in particular polymeric filler typically used in the field of sealant compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may in particular be made of hollow microspheres made of vinylidene chloride/acrylonitrile.

The mean particle size of the filler(s) which can be used is preferably less than or equal to 10 microns, more preferentially less than or equal to 3 microns, in order to prevent them from settling in the composition according to the invention during its storage.

The mean particle size is measured for a volume particle size distribution corresponding to 50% by volume of the sample of particles analyzed. When the particles are spherical, the mean particle size corresponds to the median diameter (D50 or Dv50), which corresponds to the diameter such that 50% of the particles by volume have a size which is smaller than said diameter. In the present patent application, this value is expressed in micrometers and determined according to the standard NF ISO 13320-1 (1999) by laser diffraction on an appliance of Malvern type.

Preferably, the filler is an inorganic filler.

Use may be made, as examples of inorganic filler(s), of any inorganic filler typically used in the field of surface coating, adhesive or sealant compositions. The inorganic fillers can be provided in the form of particles of diverse geometry. They can, for example, be spherical or fibrous or exhibit an irregular shape.

According to one embodiment, the filler is chosen from sand, glass beads, glass, quartz, barite, alumina, mica, talc, carbonate fillers and their mixtures.

The sand which can be used in the present invention preferably has a particle size ranging from 0.1 to 400 µm, preferentially from 1 to 400 µm, more preferably from 10 to 350 µm, more preferably from 50 to 300 µm.

The glass beads which can be used in the present invention preferably have a particle size ranging from 0.1 to 400 µm, preferentially from 1 to 400 µm, more preferably from 10 to 350 µm, more preferably from 50 to 300 µm.

Preferably, the filler is a carbonate filler chosen from alkali metal or alkaline earth metal carbonates, such as, for example, calcium carbonate.

These fillers can be natural or treated, for example using an organic acid, such as stearic acid, or a mixture of organic acids consisting predominantly of stearic acid.

The total amount of filler can vary from 0.01% to 70% by weight, preferably from 20% to 65%, preferentially from 20% to 50%, advantageously from 25% to 40%, by weight, with respect to the total weight of the composition.

Additives

The composition can comprise at least one additive, for example chosen from the group consisting of plasticizers, solvents, pigments, dyes, adhesion promoters, moisture absorbers, UV stabilizers, tackifying resins, solvents, antioxidants, glitter, fluorescent materials, rheological additives, fillers, flame retardants, waxes and their mixtures.

The abovementioned composition can comprise at least one plasticizing agent in a proportion of 5% to 30% by weight, preferably of 10% to 30% by weight, preferentially of 15% to 25% by weight, with respect to the total weight of said composition.

Mention may be made, as examples of plasticizing agent which can be used, of any plasticizing agent generally used in the field of adhesives, sealants and/or surface coatings, such as, for example, phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes and their mixtures.

Mention may be made, among the phthalates, for example, of diisononyl phthalate, diisobutyl phthalate, dioctyl phthalate, dicyclohexyl phthalate, diisooctyl phthalate, diisododecyl phthalate, dibenzyl phthalate, diisodecyl phthalate (for example sold by BASF under the name Palatinol™ DIDP) or benzyl butyl phthalate.

Mention may be made, among the benzoates, for example, of neopentyl glycol dibenzoate (for example available under the name Uniplex® 512 from Lanxess), dipropylene glycol dibenzoate (for example available under the name Benzoflex® 9-88SG from Eastman), a mixture of diethylene glycol dibenzoate and of dipropylene glycol dibenzoate (for example available under the name K-Flex® 850 S from Kalama Chemical) or a mixture of diethylene glycol dibenzoate, of dipropylene glycol dibenzoate and of triethylene glycol dibenzoate (for example available under the name Benzoflex® 2088 from Eastman).

Mention may be made, among the pentaerythritol esters, for example, of pentaerythritol tetravalerate (for example available, under the name Pevalen™, from Perstorp).

Mention may be made, among the cyclohexanedicarboxylates, for example, of diisononyl 1,2-cyclohexanedicarboxylate (for example available, under the name Hexamoll Dinch®, from BASF).

The composition according to the invention can comprise at least one rheological agent.

Mention may be made, as examples of rheological agent(s) which can be used, of any rheological agent generally used in the field of adhesive, sealant and/or surface coating compositions.

Preferably, use is made of one or more rheological agents chosen from thixotropic agents, and more preferably from:

- PVC plastisols, corresponding to a suspension of PVC in a plasticizing agent which is miscible with PVC, obtained in situ by heating to temperatures ranging from 60° C. to 80° C. These plastisols can be those described in particular in the publication Polyurethane Sealants, Robert M. Evans, ISBN 087762-998-6,
- fumed silica,
- urea derivatives resulting from the reaction of an aromatic diisocyanate monomer, such as 4,4'-MDI, with an aliphatic amine, such as butylamine. The preparation of such urea derivatives is described in particular in the application FR 1 591 172.

micronized amide waxes, such as Crayvallac® SL, Crayvallac® SLX or Crayvallac® SLT, which are sold by Arkema.

The total content of rheological agent(s) which can be used can vary from 1% to 40% by weight, preferably from 5% to 30% by weight, more preferentially from 10% to 25% by weight, with respect to the total weight of the composition.

The solvent is preferably a solvent which is volatile at a temperature of 23° C. The volatile solvent can, for example, be chosen from alcohols which are volatile at 23° C., such as ethanol or isopropanol. The volatile solvent makes it possible, for example, to reduce the viscosity of the composition and make the composition easier to apply. The volatile character of the solvent makes it possible in particular for the joint, obtained after curing the composition, to no longer contain solvent. Thus, the solvent has, for example, no negative influence on the hardness of the joint.

When a solvent, in particular a volatile solvent, is present in the composition, its content is preferably less than or equal to 5% by weight, more preferably less than or equal to 3% by weight, with respect to the total weight of the composition.

Preferably, the content of solvent(s) in the composition is of between 0% and 5% by weight.

When a pigment is present in the composition, its content is preferably less than or equal to 3% by weight, more preferably less than or equal to 2% by weight, with respect to the total weight of the composition. When it is present, the pigment can, for example, represent from 0.1% to 3% by weight or from 0.4% to 2% by weight, of the total weight of the composition.

The pigments can be organic or inorganic pigments.

For example, the pigment is $TiO_2$, in particular Kronos® 2059 sold by Kronos.

The moisture absorber, if it is present, can, for example, be chosen from non-polymeric hydrolyzable alkoxysilane derivatives, with a molecular weight of less than 500 g/mol, preferably chosen from trimethoxysilane and triethoxysilane derivatives. Such an agent can typically extend the storage life of the composition during storage and transportation before it is used. Mention may be made, for example, of γ-methacryloyloxypropyltrimethoxysilane (for example available, under the trade name Silquest® A-174, from Momentive), methacryloyloxymethyltrimethoxysilane (for example available, under the name Geniosil® XL33, from Wacker), vinyltrimethoxysilane, isooctyltrimethoxysilane or phenyltrimethoxysilane.

When a moisture absorber is present in the composition, its content is preferably less than or equal to 3% by weight, more preferably less than or equal to 2% by weight, with respect to the total weight of the composition. When it is present, the moisture absorber can, for example, represent from 0.5% to 3% by weight or from 1% to 2% by weight, with respect to the total weight of the composition.

The composition can comprise an amount of from 0.1% to 3%, preferably from 1% to 3%, by weight of at least one UV stabilizer or antioxidant. These compounds are typically introduced in order to protect the composition from degradation resulting from a reaction with oxygen which is liable to be formed by the action of heat or light. These compounds can include primary antioxidants which trap free radicals. The primary antioxidants can be used alone or in combination with other secondary antioxidants or UV stabilizers.

Mention may be made, for example, of Irganox® 1010, Irganox® B561, Irganox® 245, Irgafos® 168, Tinuvin® 328 or Tinuvin™ 770, which are sold by BASF.

The composition can comprise at least one tackifying resin, in particular when the composition is an adhesive composition. Mention may be made, as example of tackifying resin(s) which can be used, of any tackifying resin generally used in the field of adhesive compositions.

The tackifying resins are advantageously chosen from:
(i) resins obtained by polymerization of terpene hydrocarbons and of phenols, in the presence of Friedel-Crafts catalyst(s);
(ii) resins obtained by a process comprising the polymerization of α-methylstyrene, optionally in the presence of phenols;
(iii) rosins of natural origin or modified rosins (such as, for example, the rosin extracted from pine gum, wood rosin extracted from tree roots) and their derivatives which are hydrogenated, dimerized, polymerized or esterified by monoalcohols or polyols (such as, for example, glycerol or pentaerythritol);
(iv) acrylic resins having in particular a viscosity at 100° C. of less than 100 Pa·s;
(v) terpene resins;
(vi) copolymers based on natural terpenes, such as, for example, styrene/terpene, α-methylstyrene/terpene and vinyltoluene/terpene; and
(viii) their mixtures.

Such resins are commercially available and, among those of type (i), (ii), (iii) or (iv), mention may be made, for example, of the following products:
resin of type (i): Dertophene® 1510, available from DRT, having a number-average molecular weight Mn of approximately 870 Da; Dertophene® H150, available from DRT, having a number-average molecular weight Mn of approximately 630 Da; Sylvarez® TP 95, available from Kraton, having a number-average molecular weight of approximately 1200 Da;
resin of type (ii): Norsolene® W100, available from Cray Valley, obtained by polymerization of α-methylstyrene without action of phenols, having a number-average molecular weight of 900 Da; Sylvarez® 510, which is available from Kraton, having a number-average molecular weight of approximately 1740 Da, the process for the production of which comprises the addition of phenols;
resin of type (iii): Sylvalite® RE 100, which is an ester of rosin and of pentaerythritol available from Kraton, and the number-average molecular weight of which is approximately 1700 Da.

The tackifying resin preferably exhibits a number-average molecular weight ranging from 100 to 6,000 g/mol, preferably from 300 to 4,000 g/mol, preferentially from 500 to 2,000 g/mol.

The number-average molecular weights of the tackifying resins can be measured according to methods well known to a person skilled in the art, for example by size exclusion chromatography using a standard of polystyrene type.

The composition can comprise from 5% to 20%, preferably from 5% to 10%, by weight of at least one tackifying resin, with respect to the total weight of said composition.

Composition

The composition can be an adhesive, sealant and/or surface coating composition, in particular for the construction field.

According to one embodiment, the composition is devoid of tin or of tin-based compounds, in particular of tin-based catalysts.

The total content of catalyst A in the composition can be less than or equal to 1000 ppm, preferably less than or equal to 250 ppm, advantageously less than or equal to 50 ppm, preferentially less than or equal to 20 ppm, in particular less than or equal to 5 ppm, for example less than or equal to 1 ppm, with respect to the total weight of the composition.

According to one embodiment, when the catalyst A is chosen from tertiary amines, its total content is less than 400 ppm, preferably less than or equal to 100 ppm, preferentially less than or equal to 50 ppm, for example less than or equal to 20 ppm, advantageously less than or equal to 10 ppm, with respect to the total weight of the composition.

Preferably, the composition does not comprise another catalyst than the abovementioned catalysts A and B.

Preferably, when the catalyst A is chosen from tertiary amines, its nature is different from the catalyst B.

Preferably, the catalyst A is different from the catalyst B.

According to one embodiment, the present invention relates to a composition comprising:
- at least one polyurethane having NCO end groups obtained by a process comprising at least one stage of polyaddition of a composition of polyol(s) and of a composition of polyisocyanate(s), in the presence of at least one catalyst A chosen from organometallic catalysts based on bismuth and/or zinc, such as, for example, bismuth carboxylates, zinc carboxylates, bismuth/zinc carboxylates and their mixtures, and preferentially bismuth carboxylates;
- optionally at least one filler; and
- at least one catalyst B chosen from tertiary amines, such as, for example, chosen from 2,2'-dimorpholinodiethyl ether (DMDEE), 1,4-diazabicyclo[2.2.2]octane (DABCO) and their mixtures.

According to one embodiment, the present invention relates to a composition comprising:
- at least one polyurethane having NCO end groups obtained by a process comprising at least one stage of polyaddition of a composition of polyol(s) and of a composition of polyisocyanate(s), in the presence of at least one catalyst A chosen from tertiary amines, the catalyst A being in particular 1,4-diazabicyclo[2.2.2] octane (DABCO);
- optionally at least one filler; and
- at least one catalyst B chosen from tertiary amines, such as, for example, chosen from 2,2'-dimorpholinodiethyl ether (DMDEE), 1,4-diazabicyclo[2.2.2]octane (DABCO) and their mixtures, the content of catalyst A being less than 400 ppm, preferably less than or equal to 100 ppm, preferentially less than or equal to 50 ppm, for example less than or equal to 20 ppm, advantageously less than or equal to 10 ppm.

According to one embodiment, the composition comprises:
- from 10% to 40% by weight, preferably from 15% to 30% by weight, of polyurethane having NCO end groups as defined above;
- from 20% to 70% by weight, preferably from 25% to 60% by weight, of at least one filler;
- from 0.001% to 1% by weight of at least one catalyst B, the percentages by weight being expressed with respect to the total weight of the composition.

According to one embodiment, the composition comprises:
- from 10% to 40% by weight, preferably from 15% to 30% by weight, of polyurethane having NCO end groups as defined above;
- from 20% to 70% by weight, preferably from 25% to 60% by weight, preferentially from 25% to 40% by weight, of at least one filler;
- from 0.001% to 1% by weight, preferably from 0.01% to 0.8% by weight, of at least one catalyst B; and
- from 0% to 40% by weight, preferentially from 1% to 40% by weight, preferably from 5% to 30% by weight, of at least one additive chosen from the group consisting of plasticizers, solvents, pigments, dyes, adhesion promoters, moisture absorbers, UV stabilizers, tackifying resins, solvents, antioxidants, glitter, fluorescent materials, rheological additives, fillers, flame retardants, waxes and their mixtures, the percentages by weight being expressed with respect to the total weight of the composition.

The composition is preferably stored in an anhydrous environment, for example in a hermetic packaging where the composition is sheltered from moisture and preferably sheltered from light.

According to one embodiment, the composition is an adhesive, sealant and/or surface coating composition. Preferably, the composition is a sealant composition.

The compositions according to the invention are advantageously less toxic and less dangerous to man and the environment than the existing compositions.

The compositions according to the invention advantageously exhibit a spectrum of varied properties which makes it possible to use them in diverse applications as adhesive, surface coating or sealant, such as, for example, in the field of construction or transportation.

The compositions according to the invention are advantageously stable in terms of viscosity over long storage times, and are in fact easy to employ. In particular, the adhesive, sealant and/or surface coating compositions according to the invention advantageously exhibit good properties of extrusion or of coating at ambient temperature through the devices for mixing and/or applying coating compositions, adhesive compositions or sealants.

The compositions according to the invention are advantageously sealant compositions exhibiting in particular a good compromise between storage stability in terms of viscosity, and mechanical and/or adhesion properties.

C. Uses

The present invention also relates to the use of a composition as defined above as adhesive, sealant or surface coating, preferably as sealant, for example as construction sealant.

The composition can in particular be used to form sealing and expansion joints in buildings, in particular between concrete/concrete substrates.

The composition according to the invention can be in the one-component form, that is to say that all the components are packaged in one and the same compartment.

The composition is preferably ready-for-use, that is to say that the user (private individual or professional) can directly apply the composition in order to produce the joint, without having to carry out premixing.

All the embodiments described above can be combined with one another. In particular, the various abovementioned constituents, and in particular the preferred embodiments, of the composition can be combined with one another.

In the context of the invention, the term "of between x and y" or "ranging from x to y" is understood to mean an interval in which the limits x and y are included. For example, the range "of between 10% and 60%" includes in particular the values 10% and 60%.

The following examples illustrate the invention without, however, limiting it.

EXPERIMENTAL SECTION

Ingredients:

The following products were used in the manufacture of the compositions according to the invention:

DIDP (sold by BASF): diisodecyl phthalate (plasticizer);
$TiO_2$ (sold by Cristal): titanium dioxide (pigment);
$Ca(OH)_2$ (sold by Omya): calcium hydroxide ($CO_2$ scavenger);
$CaCO_3$ (sold by Omya) is a calcium carbonate (filler);
Xylene (sold by Total): solvent;
PTSI (sold by Borchers): p-toluenesulfonyl isocyanate (CAS number: 4083-64-1) ($H_2O$ scavenger);
PVC (sold by Solvay): polyvinyl chloride powder (organic filler);
Isonate® M125 (sold by Dow): mixture of MDI isomers containing at least 97% of the 4,4'-MDI (4,4'-diphenylmethylene diisocyanate) isomer having a percentage by weight of NCO of 33.6%;
Voranol® P2000 (sold by Dow): polyoxypropylene diol with a number-average molecular weight (Mn) in the vicinity of 2000 g/mol having a hydroxyl number of approximately 56 mg KOH/g;
Borchi® KAT 315 (sold by Borchers): bismuth neodecanoate (CAS number: 34364-26-6);
Amicure® TEDA (sold by Evonik): DABCO: 1,4-diazabicyclo[2.2.2]octane (CAS number: 280-57-9);
Jeffcat® DMDEE (sold by Huntsman): 2,2'-dimorpholinodiethyl ether (CAS number: 6425-39-4).

Example 1: Preparation of a Composition D Consisting of a 23.3% Weight/Weight Suspension of Bisurea in DIDP First of all, a solution A of 17.17% weight/weight of n-butylamine in 82.83% weight/weight of DIDP and a solution B of 29.46% weight/weight of 4,4'-MDI in 70.34% weight/weight of DIDP are prepared. The two solutions A and B are heated to 100° C. and then introduced, each under a pressure of 100 bar, into a reactor, in which they are sprayed continuously over one another in a ratio A/B=50.1/49.9 by weight, corresponding to an n-butylamine/MDI molar ratio equal to 2. The reaction is immediate and the temperature of the reactor reaches 140° C. at the end of manufacture.

At the reactor outlet, a composition D of 23.3% weight/weight of a bisurea in DI DP is obtained, the bisurea being of formula:

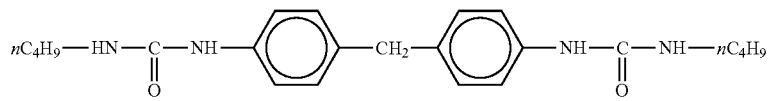

The Brookfield viscosity of the suspension D, measured at 23° C., is 15 Pa·s.

Example 2: Preparation of the Polyurethanes Having NCO End Groups

The following polymers were prepared according to the following procedure, under anhydrous conditions:

Isonate® M125 is introduced into a reactor and the medium is heated to 40° C. A polyoxypropylene triol (having a OHN of 44.5±1.5 mg KOH/g and a number-average molecular weight of approximately 3780±100 g/mol), Voranol P200, is then introduced, followed by the solvent (xylene). The mixture is subsequently heated up to 50° C., with stirring. The catalyst is then added. The mixture is subsequently heated with stirring up to 85° C. and then held at this temperature for 2 hours.

The amounts shown in the following table are expressed as percentages by weight with respect to the total weight of the polyurethane composition.

TABLE 1

| polyurethanes | Polyurethane P1 | Polyurethane P2 |
|---|---|---|
| Polyoxypropylene triol (OHN = 44.5 ± 1.5 mg KOH/g, Mn = 3780 ± 100 g/mol), | 41.95 | 41.95 |
| Voranol P2000 | 27.5 | 27.5 |
| Isonate ® M125 (% NCO = 33.6% by weight) | 14 | 14 |
| Xylene (solvent) | Up to 100% | Up to 100% |
| Borchi KAT 315 (catalyst A) | 0.000063 (=0.63 ppm) | — |
| Amicure ® TEDA: DABCO (catalyst A) | — | 0.00095 (=9.5 ppm) |
| NCO/OH Molar ratio | 1.8 | 1.8 |
| Final % by weight of NCO | 2.5 | 2.5 |

Example 3: Preparation of the Sealant Compositions

The sealant compositions were obtained according to the following process:
mixing of the DIPD and of the fillers $CaCO_3$ and $Ca(OH)_2$,
increasing the temperature of the mixture with stirring up to approximately 90° C. under vacuum until the medium is dry,
decreasing the temperature to 50° C.,
adding the polyurethane P1 or P2;
adding the PVC, the composition D (example 1) and then the dehydrating agent and the other additives;
finally, adding the catalyst (catalyst B according to the invention).

The amounts shown in the following table 2 are expressed as percentages by weight with respect to the total weight of the sealant composition.

TABLE 2

| sealant composition | | | | |
|---|---|---|---|---|
| | Composition C1 (% by weight) | Composition C2 (% by weight) | Composition C3 (% by weight) | Composition C4 (% by weight) |
| Ca(OH)$_2$ | 1.4 | 1.4 | 1.4 | 1.4 |
| CaCO$_3$ | 2.4 | 2.4 | 2.4 | 2.4 |
| DIDP | 11.2 | 11.2 | 11.2 | 11.2 |
| TiO$_2$ | 5 | 5 | 5 | 5 |
| Polyurethane P1 | 32.6 | 32.6 | 32.6 | |
| Polyurethane P2 | | | | 32.6 |
| Composition D (example 1) | 9.7 | 9.7 | 9.7 | 9.7 |
| PVC | 13.9 | 13.9 | 13.9 | 13.9 |
| PTSI | 0.6 | 0.6 | 0.6 | 0.6 |
| Xylene | 0.7 | 0.7 | 0.7 | 0.7 |
| Additives | Up to 100% | Up to 100% | Up to 100% | Up to 100% |
| DMDEE (catalyst B) Jeffcat ® DMDEE | 0.2 | | | 0.2 |
| DABCO (catalyst B) Amicure ® TEDA | | 0.2 | | |
| DMDEE/DABCO (1/1 by weight) (catalyst B) (Jeffcat ® DMDEE/Amicure ® TEDA) | | | 0.2 | |

The sealant compositions C1 to C4 were extruded through an extrusion nozzle with a diameter of 4 mm under a pressure of 3 bar at constant temperature and constant hygrometry in order to evaluate their viscosity.

The viscosity measurement (in millipascal·second (mPa·s)) was carried out at 23° C. at tO and t+3 weeks using a Brookfield RVT viscometer, with a number 5 spindle at a rotational speed of 20 revolutions per minute (rev/min).

The extrusion corresponds to the amount in grams of sealant which could be extruded per minute, under a pressure of the piston of 3 bars at 23° C.

It was found that the sealant compositions C1 to C4 are stable and marketable.

Example 4: Results

The sealant compositions formulated from each polyurethane P1 and P2 were characterized as given in table 3.

Elongation at Break

The measurement of the tensile strength and the elongation at break by a tensile test was carried out according to the protocol described below.

The principle of the measurement consists in drawing, in a tensile testing device, the movable jaw of which moves at a constant rate equal to 100 mm/minute, a standard test specimen consisting of the crosslinked composition and in recording, at the moment when the test specimen breaks, the tensile stress applied (in MPa) and also the elongation of the test specimen (in %). The standard test specimen is dumbbell-shaped, as illustrated in the international standard ISO 37 of 2011. The narrow part of the dumbbell used has a length of 20 mm, a width of 4 mm and a thickness of 500 μm.

Modulus at 100% Elongation

The modulus at 100% elongation was measured according to the test appearing in the standard ISO 37 of 2011.

Modulus of Maximum Elongation at Break

The modulus of maximum elongation at break is measured according to the standard ISO 37 of 2011.

TABLE 3

| characterization of the sealant compositions | | | |
|---|---|---|---|
| | Elongation at break (%) | Modulus at 100% elongation (MPa) | Modulus of maximum elongation at break (MPa) |
| Composition C1 | 391 | 1.32 | 1.60 |
| Composition C2 | 819 | 0.70 | 1.48 |
| Composition C3 | 658 | 0.75 | 1.50 |
| Composition C4 | 376 | 1.29 | 1.54 |

It is found that, by varying only the nature of the catalysts A and B, compositions exhibiting varied properties are advantageously obtained, this being achieved without having to modify the nature of the other ingredients of the compositions.

The invention claimed is:

1. A process for the preparation of a composition comprising at least one polyurethane having NCO end groups and at least one catalyst B chosen from tertiary amines, said process comprising the following stages:
   a) preparing a polyurethane having NCO end groups, comprising a stage of polyaddition of a composition of polyol(s) and of a composition of polyisocyanate(s), in the presence of at least one catalyst A consisting of the compounds selected from the group consisting of:
      organometallic catalysts, with the exception of tin-based catalysts,
      tertiary amines, and
      their mixtures,
   b) adding at least one catalyst B chosen from tertiary amines to the polyurethane having NCO end groups obtained on conclusion of stage a),
   wherein a total content of catalyst(s) A is less than or equal to 20 ppm, with respect to the total weight of the reactants used in the polyaddition reaction.

2. The process as claimed in claim 1, wherein the polyisocyanate(s) is (are) chosen from the group consisting of hexamethylene diisocyanate (HDI), heptane diisocyanate, octane diisocyanate, nonane diisocyanate, decane diisocyanate, undecane diisocyanate, dodecane diisocyanate, methylenebis(4-cyclohexyl isocyanate) (HMDI), isophorone diisocyanate (IPDI), norbornane diisocyanate, norbornene diisocyanate, 1,4-cyclohexane diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2, 4,4-trimethylhexane, 1,6-diisocyanato-2,2,4-trimethylhexane (TMDI), 4-isocyanatomethyl-1,8-octane diisocyanate (TIN), 2,5-bis(isocyanatomethyl)bicyclo [2.2.1]heptane (2,5-NB DI), 2,6-bis(isocyanatomethyl)bicyclo [2.2.1]heptane (2,6-NB DI), 1,3-bis(isocyanatomethyl) cyclohexane (1,3-H6-XDI), 1,4-bis(isocyanatomethyl)cyclohexane (1,4-H6-XDI), toluene diisocyanate (TDI), diphenylmethylene diisocyanate (MDI), xylylene diisocyanate (XDI) and their mixtures.

3. The process as claimed in claim 1, wherein the polyaddition stage is carried out in amounts of polyisocyanate(s) and of polyol(s) such that the NCO/OH molar ratio is strictly greater than 1.

4. The process as claimed in claim 1, wherein the catalyst A is chosen from organometallic catalysts, metal alkoxides, metal carboxylates and metal coordination complexes with one or more organic ligands.

5. The process as claimed in claim 1, wherein the catalyst A is chosen from metal carboxylates.

6. The process as claimed in claim 1, wherein the catalyst A is a tertiary amine chosen from the group consisting of triethylamine, tributylamine, N,N-dimethylcyclohexylamine, dimethylbenzylamine, N,N'-dimethylpiperazine, N,N,N,N-tetramethylpropane-1,3-diamine, bis(2-dimethylaminoethyl) ether, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1, 3-diamine, N,N,N,N-tetramethylpropane-1,3-diamine, N,N, N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl) hexahydrotriazine, tetramethylguanidine, 1,8-diazabicyclo [5.4.0]undec-7-ene (DB U), 1,4-diazabicyclo [2.2.2]octane (DABCO), 1,5-diazabicyclo [4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol and their mixtures.

7. The process as claimed in claim 1, wherein the total content of catalyst(s) A is less than or equal to 1 ppm, with respect to the total weight of the reactants used in the polyaddition reaction.

8. The process as claimed in claim 1, wherein it is carried out in the absence of tin or of tin-based compounds.

9. The process as claimed in claim 1, wherein, when the catalyst A is chosen from tertiary amines, its nature is different from the catalyst B.

10. The process as claimed in claim 1, wherein the catalyst B is chosen from 2,2'-dimorpholinodiethyl ether (DMDEE), 1,4-diazabicyclo [2.2.2]octane (DABCO) and their mixtures.

11. A composition comprising:
at least one polyurethane having NCO end groups obtained by a process comprising at least one stage of polyaddition of a composition of polyol(s) and of a composition of polyisocyanate(s), in the presence of at least one catalyst A consisting of the compounds chosen from the group consisting of:
organometallic catalysts, with the exception of tin-based catalysts,
tertiary amines, and
their mixtures, and
at least one catalyst B chosen from tertiary amines,
wherein, when the catalyst A is chosen from tertiary amines, its content is less than 20 ppm, with respect to the total weight of the reactants used in the polyaddition reaction.

12. The composition as claimed in claim 11, wherein the catalyst A is chosen from organometallic catalysts, metal alkoxides, metal carboxylates and metal coordination complexes with one or more organic ligand(s).

13. The composition as claimed in claim 11, wherein the catalyst A is chosen from metal carboxylates.

14. The composition as claimed in claim 11, wherein the catalyst A is a tertiary amine chosen from the group consisting of triethylamine, tributylamine, N,N-dimethylcyclohexylamine, dimethylbenzylamine, N,N'-dimethylpiperazine, N,N,N,N-tetramethylpropane-1,3-diamine, bis(2-dimethylaminoethyl) ether, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1, 3-diamine, N,N,N,N-tetramethylpropane-1,3-diamine, N,N, N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl) hexahydrotriazine, tetramethylguanidine, 1,8-diazabicyclo [5.4.0]undec-7-ene (DB U), 1,4-diazabicyclo [2.2.2]octane (DABCO), 1,5-diazabicyclo [4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol and their mixtures.

15. The composition as claimed in claim 11, wherein it is devoid of tin or of tin-based compounds.

16. The composition as claimed in claim 11, wherein it does not comprise a catalyst other than the catalysts A and B.

17. The composition as claimed in claim 11, wherein it comprises:
at least one polyurethane having NCO end groups obtained by a process comprising at least one stage of polyaddition of a composition of polyol(s) and of a composition of polyisocyanate(s), in the presence of at least one catalyst A chosen from organometallic catalysts based on bismuth and/or zinc;
optionally at least one filler; and
at least one catalyst B chosen from tertiary amines.

18. The composition as claimed in claim 11, wherein it comprises:
at least one polyurethane having NCO end groups obtained by a process comprising at least one stage of polyaddition of a composition of polyol(s) and of a composition of polyisocyanate(s), in the presence of at least one catalyst A, wherein catalyst A comprises 1,4-diazabicyclo[2.2.2]octane (DABCO);
optionally at least one filler; and
at least one catalyst B chosen from tertiary amines.

19. The composition as claimed in claim 11, wherein it comprises:
from 10% to 40% by weight of polyurethane having NCO end groups;
from 20% to 70% by weight of at least one filler;
from 0.001% to 1% by weight of at least one catalyst B; and
from 0% to 40% by weight of at least one additive chosen from the group consisting of plasticizers, solvents, pigments, dyes, adhesion promoters, moisture absorbers, UV stabilizers, tackifying resins, solvents, antioxidants, glitter, fluorescent materials, rheological additives, fillers, flame retardants, waxes and their mixtures, wherein the percentages by weight are expressed with respect to the total weight of the composition.

20. The composition as claimed in claim 11, wherein it is an adhesive, sealant and/or surface coating composition, for the field of construction.

\* \* \* \* \*